(12) United States Patent
Deng

(10) Patent No.: US 12,422,352 B1
(45) Date of Patent: Sep. 23, 2025

(54) COMPREHENSIVE ENVIRONMENTAL MONITOR AND SPECTROSCOPIC ANALYSIS METHOD

(71) Applicant: Mulan Deng, Guangdong (CN)

(72) Inventor: Mulan Deng, Guangdong (CN)

( * ) Notice: Subject to any disclaimer, the term of this patent is extended or adjusted under 35 U.S.C. 154(b) by 0 days.

(21) Appl. No.: 18/975,094

(22) Filed: Dec. 10, 2024

(51) Int. Cl.
*G01N 21/25* (2006.01)
*G01J 5/02* (2022.01)
*G01J 5/04* (2006.01)
*G01J 5/08* (2022.01)
*G01J 5/0802* (2022.01)

(52) U.S. Cl.
CPC .......... *G01N 21/255* (2013.01); *G01J 5/0205* (2013.01); *G01J 5/04* (2013.01); *G01J 5/0802* (2022.01); *G01J 5/0881* (2013.01); *G01N 2201/0221* (2013.01)

(58) Field of Classification Search
CPC ...... G01N 21/255; G01N 21/25; G01N 21/31; G01N 2201/0221; G01J 5/0802; G01J 5/0205; G01J 5/04; G01J 5/0881
USPC ................................................. 356/300, 244
See application file for complete search history.

(56) References Cited

U.S. PATENT DOCUMENTS

| | | | |
|---|---|---|---|
| 2008/0146890 A1* | 6/2008 | LeBoeuf | A61B 5/4839 600/300 |
| 2010/0305859 A1* | 12/2010 | Fogarty | G01W 1/06 374/E1.001 |
| 2012/0223220 A1* | 9/2012 | Arai | G01J 1/429 250/252.1 |
| 2013/0258345 A1* | 10/2013 | Lin | G01N 21/3504 356/437 |

* cited by examiner

*Primary Examiner* — Sunghee Y Gray
(74) *Attorney, Agent, or Firm* — Justin Lampel

(57) ABSTRACT

Provided are a comprehensive environmental monitor and a spectroscopic analysis method. The comprehensive environmental monitor includes a housing, a control and analysis module, a detection probe, and a light filter component, where the housing is provided with a mounting cavity and a plurality of light transmitting holes that communicate with the mounting cavity, the control and analysis module is mounted in the mounting cavity, the detection probe is connected to the housing and is in communication connection to the control and analysis module, a plurality of light sensors of the light filter component are mounted in the mounting cavity and are in communication connection to the control and analysis module, and one light filter is mounted in one light transmitting hole, and is disposed opposite to one light sensor. In this application, different wavelengths in light can be simultaneously detected and analyzed correspondingly.

3 Claims, 11 Drawing Sheets

COMPREHENSIVE ENVIRONMENTAL MONITOR AND SPECTROSCOPIC ANALYSIS METHOD

TECHNICAL FIELD

The present disclosure relates to the field of detection instrument technologies, and in particular, relates to a comprehensive environmental monitor and a spectroscopic analysis method.

BACKGROUND

Growth of plants depends on good and suitable external environmental conditions. Currently, most of environmental monitors on the market have a plurality of monitoring functions and can be configured to monitor a plurality of environmental indictors such as a PH value and fertility of soil, humidity in air, and a temperature.

In a related technology, a comprehensive environmental monitoring apparatus has no spectroscopic detection and analysis function, cannot be configured to: effectively monitor and analyze light such as sunshine or lamplight, and is inconvenient to use.

SUMMARY

A main objective of the present disclosure is to provide a comprehensive environmental monitor, to have a spectroscopic detection and analysis function, and facilitate use of a user.

To achieve the objective, the comprehensive environmental monitor provided in the present disclosure includes:
  a housing, where the housing is provided with a mounting cavity and a plurality of light transmitting holes that communicate with the mounting cavity;
  a control and analysis module, where the control and analysis module is mounted in the mounting cavity;
  a detection probe, where the detection probe is connected to the housing, and is in communication connection to the control and analysis module; and
  a light filter component, where the light filter component includes a plurality of light filters and a plurality of light sensors, the plurality of light sensors are mounted in the mounting cavity, and are in communication connection to the control and analysis module, and one light filter is mounted in one light transmitting hole, and is disposed opposite to one light sensor.

In an optional embodiment, a positioning flange is protruded from a side wall of the light transmitting hole, the positioning flange is disposed around the light sensor, and the light filter fits a surface of the positioning flange.

In an optional embodiment, a mounting groove is provided on a side wall of the mounting cavity, an avoidance hole that communicates with the mounting groove is provided in the housing, an end part of the detection probe is rotatably clamped into the mounting groove, and partially extends out from the avoidance hole.

In an optional embodiment, a plurality of positioning grooves are recessed on the end part of the detection probe, a positioning protrusion is protruded from a side wall of the mounting groove, the detection probe rotates relative to the housing, and the positioning protrusion is capable of being embedded into any positioning groove.

In an optional embodiment, the positioning protrusion includes a protrusion body and a positioning elastic sheet that is connected to the protrusion body, the positioning elastic sheet is connected to the side wall of the mounting groove, and the protrusion body is embedded into the positioning groove.

In an optional embodiment, the detection probe includes a mounting base and a probe body, an end part of the mounting base is rotatably connected to the mounting groove, an end part of the probe body is provided with a clamping groove, and an end part that is of the mounting base and that is away from the housing is clamped into the clamping groove.

In an optional embodiment, the probe body is further provided with an avoidance notch and a clamping notch that communicate with the clamping groove, the avoidance notch penetrates an upper surface of the probe body and is disposed to form an included angle with the clamping notch, a clamping protrusion is protruded from the mounting base, and the clamping protrusion extends into the clamping notch through the avoidance notch, and is rotatably clamped into the clamping notch.

In an optional embodiment, the comprehensive environmental monitor further includes a first display and a second display that are spaced from each other on the housing, and the first display and the second display are in communication connection to the control and analysis module; and
  the first display is configured to display a detection and analysis result of the light sensor, and the second display is configured to display a detection and analysis result of the detection probe.

The prevent disclosure further provides a spectroscopic analysis method, applied to the comprehensive environmental monitor, where the spectroscopic analysis method includes the following steps:
  filtering, by a light filter, light emitted by a to-be-detected light source to obtain preset filtered light;
  sensing and receiving, by a light sensor, the preset filtered light, and performing signal conversion on a wavelength of the preset filtered light, to obtain a wavelength electrical signal; and
  receiving, by a control and analysis module, the wavelength electrical signal, and detecting and analyzing the wavelength electrical signal.

In an optional embodiment, after the step of receiving, by a control and analysis module, the wavelength electrical signal, and detecting and analyzing the wavelength electrical signal, the spectroscopic analysis method further includes:
  displaying, by a display, the detection and analysis result, where the detection and analysis result includes at least a wavelength, and wavelength intensity.

The comprehensive environmental monitor provided in the technical solution of the present disclosure includes the housing, and the housing includes the mounting cavity and the plurality of light transmitting holes that communicate with the mounting cavity. The control and analysis module is mounted in the mounting cavity, the detection probe is connected to the housing and is in communication connection to the control and analysis module, the plurality of light sensors of the light filter component are mounted in the mounting cavity and are in communication connection to the control and analysis module, and one light filter is mounted in one light transmitting hole, and is disposed opposite to one light sensor. According to this application, the mounting cavity is configured to monitor components of the comprehensive environmental monitor, and the control and analysis module is in mutual communication connection to the detection probe, so that the comprehensive environmental monitor can be configured to monitor parameters such as humidity and a temperature in an external environment or a PH value of soil. The light filter mounted on the light transmitting hole is configured to filter light, to obtain special light waves to be detected and analyzed. The light sensor disposed corresponding to the light filter can be configured to: sense the special light waves and convert the special light waves into electrical signals for being transmitted to a side of the control and analysis module in communication connection to the light sensor. The control and analysis module is configured to: detect and analyze the electrical signal. According to this application, the plurality of light filters are provided, so that different wavelengths in light can be simultaneously detected and analyzed correspondingly. Types of the light filters can be set according to actual requirements, so that a user does not need an additional professional spectroscopic analyzer to implement a spectroscopic analysis function of the comprehensive environmental monitor, greatly facilitating an operation of monitoring and analyzing a plant growth environment by the comprehensive environmental monitor.

BRIEF DESCRIPTION OF THE DRAWINGS

To describe the technical solutions in the embodiments of the present application or in the prior art more clearly, the following briefly describes the drawings required for describing the embodiments or the prior art. Apparently, the drawings in the following description show some embodiments of the present application, and those of ordinary skill in the art may still derive other drawings from these drawings without creative efforts.

DESCRIPTION OF REFERENCE NUMERALS

Figure 1:
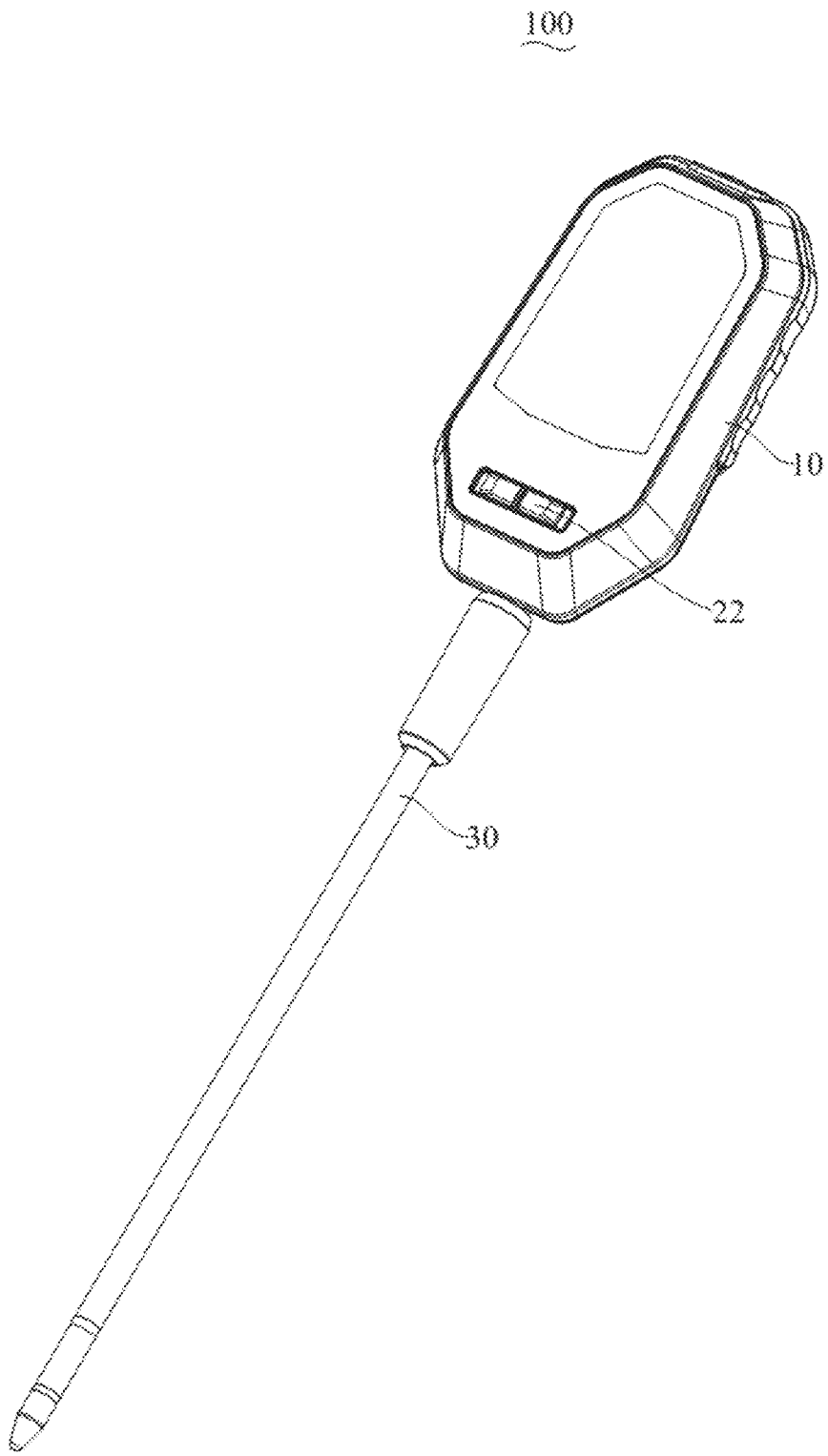
FIG. 1 is a schematic structural diagram of a comprehensive environmental monitor according to an embodiment of the present disclosure.
Figure 2:
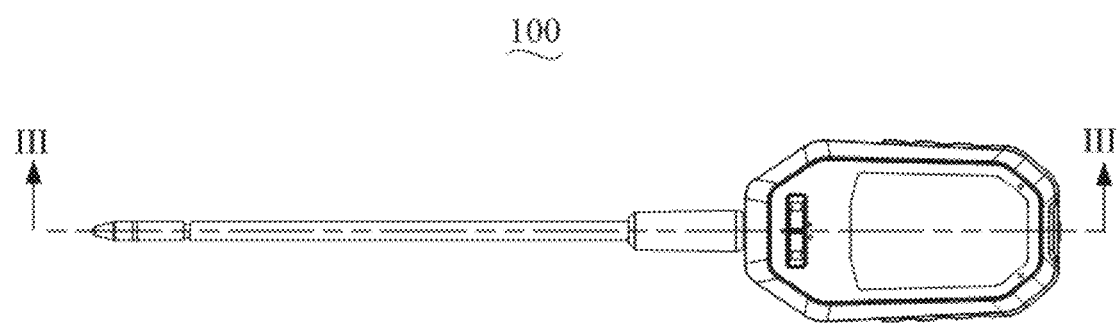
FIG. 2 is a top view of the comprehensive environmental monitor shown in FIG. 1.

| Reference numerals | Names |
| --- | --- |
| 100 | Comprehensive environmental monitor |
| 10 | Housing |
| 10a | Mounting cavity |
| 10b | Light transmitting hole |
| 10c | Mounting groove |
| 10d | Avoidance hole |
| 11 | Upper housing |
| 111 | Positioning flange |
| 112 | Positioning protrusion |
| 1121 | Protrusion body |
| 1122 | Positioning elastic sheet |
| 12 | Lower housing |
| 13 | Light transmitting cover plate |
| 14 | Middle frame |
| 20 | Control and analysis module |
| 21 | Control circuit board |
| 22 | Control button |
| 30 | Detection probe |
| 30a | Positioning groove |
| 31 | Mounting base |
| 311 | Clamping protrusion |
| 32 | Probe body |
| 32a | Clamping notch |
| 32b | Avoidance notch |
| 40 | Light filter component |
| 41 | Light filter |
| 42 | Light sensor |
| 51 | First display |
| 52 | Second display |

The implementation of the objectives, functional characteristics and advantages of the present disclosure will be further described below with reference to the embodiments and the drawings.

DETAILED DESCRIPTION OF THE EMBODIMENTS

The following clearly and completely describes the technical solutions in the examples of the present disclosure with reference to the accompanying drawings in the examples of the present disclosure. Apparently, the described examples are merely a part rather than all of the examples of the present disclosure. All other examples obtained by a person of ordinary skill in the art based on the examples of the present disclosure without creative efforts shall fall within the protection scope of the present disclosure. All other examples obtained by a person of ordinary skill in the art based on the examples of the present disclosure without creative efforts shall fall within the protection scope of the present disclosure.

It should be noted that all the directional indications (such as upper, lower, left, right, front, and rear) in the embodiments of the present disclosure are merely used to explain relative position relationships, motion situations, and the like of the components in a specific gesture (as shown in the figures). If the specific gesture changes, the directional indication also changes accordingly.

Moreover, the terms such as "first" and "second" used herein are only for the purpose of description and are not intended to indicate or imply relative importance, or implicitly indicate the number of the indicated technical features. Therefore, features defined by "first" and "second" may explicitly or implicitly include at least one of the features. Further, the technical solutions of various embodiments may be combined with each other, but it must be on the basis that a combination thereof can be implemented by those of ordinary skill in the art. In case of a contradiction with the combination of the technical solutions or a failure to implement the combination, it should be considered that the combination of the technical solutions does not exist, and is not within the protection scope of the present disclosure.

Refer to FIG. 1 to FIG. 8. The present disclosure provides a comprehensive environmental monitor 100.

In embodiments of the present disclosure, the comprehensive environmental monitor 100 includes a housing 10, a control and analysis module 20, a detection probe 30, and a light filter component 40. The housing 10 is provided with a mounting cavity 10a and a plurality of light transmitting holes 10b that communicate with the mounting cavity 10a. The control and analysis module 20 is mounted in the mounting cavity 10a. The detection probe 30 is connected to the housing 10 and is in communication connection to the control and analysis module 20. The light filter component 40 includes a plurality of light filters 41 and a plurality of light sensors 42. The plurality of light sensors 42 are mounted in the mounting cavity 10a and are in communication connection to the control and analysis module 20. One light filter 41 is mounted in one light transmitting hole 10b, and is disposed opposite to one light sensor 42.

Specifically, in this embodiment, the housing 10 includes an upper housing 11, a lower housing 12, and a middle frame 14 that are detachably connected. The upper housing 11, the lower housing 12, and the middle frame 14 are integrally formed by a plastic material through injection molding. Studs are provided on two opposite sides of the middle frame 14. A screw hole is provided on the stud. Connection holes are provided on the upper housing 11 and the lower housing 12. Bolts penetrate the connection holes and the screw holes for connecting the upper housing 11 and the lower housing 12 to the middle frame 14, so that the upper housing 11, the lower housing 12, and the middle frame 14 are spliced into the mounting cavity 10a configured to mount each component. Three light transmitting holes 10b that communicate with the mounting cavity 10a are provided on the upper housing 11. In this application, the upper housing 11, the lower housing 12, and the middle frame 14 are detachably connected through the bolts, facilitating assembling and disassembling for maintenance. Certainly, the upper housing 11, the lower housing 12, and the middle frame 14 may alternatively be connected through a buckle structure, which is not specifically limited thereto.

The control and analysis module 20 includes a control circuit board 21 and a control button 22. The control circuit board 21 includes a printed circuit board (PCB) and a plurality of electronic components welded on a surface of the printed circuit board. Both a detection and analysis chip and the control button 22 are welded on a surface of the control circuit board 21. Preset program is provided in the detection and analysis chip. The detection and analysis chip can be configured to: receive an electrical signal transmitted from a sensor or another electronic component, and analyze the electrical signal to obtain various parameters of an external environment, such as humidity, a temperature, and a PH value. The technology is mature. Details are not described herein again. The control button 22 is welded on the surface of the control circuit board 21. A through hole that communicates with the mounting cavity 10a is provided on the upper housing 11. The control button 22 is partially exposed through the through hole. The control button 22 is disposed, so that a user performs a corresponding operation.

The plurality of light sensors 42 of the light filter component 40 are welded on the surface of the control circuit board 21, and are positioned in the mounting cavity 10a. The light sensor 42 is in communication connection to the detection and analysis chip through a circuit on the control circuit board 21. The plurality of light sensors 42 are spaced from each other. One light filter 41 is correspondingly mounted in one light transmitting hole 10b. In a vertical direction, the light filter 41 is disposed opposite to the light sensor 42, so that the light sensor 42 can sense light from the light filter 41 to a greatest extent. It may be understood that, the light filters 41 can be selected and freely combined according to an actual application scenario, which is not specifically limited thereto.

In this application, the control and analysis module 20 is in mutual communication connection to the detection probe 30, so that the comprehensive environmental monitor 100 can be configured to monitor parameters such as humidity and a temperature in an external environment or a PH value of soil. The light filter 41 mounted on the light transmitting hole 10b is configured to filter light, to obtain special light waves to be detected and analyzed. The light sensor 42 disposed corresponding to the light filter 41 can be configured to: sense the special light waves and convert the special light waves into electrical signals for being transmitted to a side of the control and analysis module 20 in communication connection to the light sensor. The control and analysis module 20 is configured to: detect and analyze the electrical signal. According to this application, the plurality of light filters are provided, so that different wavelengths in light can be correspondingly detected and analyzed simultaneously. Types of the light filters can be set according to actual requirements, so that a user does not need an additional professional spectroscopic analyzer to implement a spectroscopic analysis function of the comprehensive environmental monitor 100, greatly facilitating an operation of monitoring and analyzing a plant growth environment by the comprehensive environmental monitor.

Figure 3:
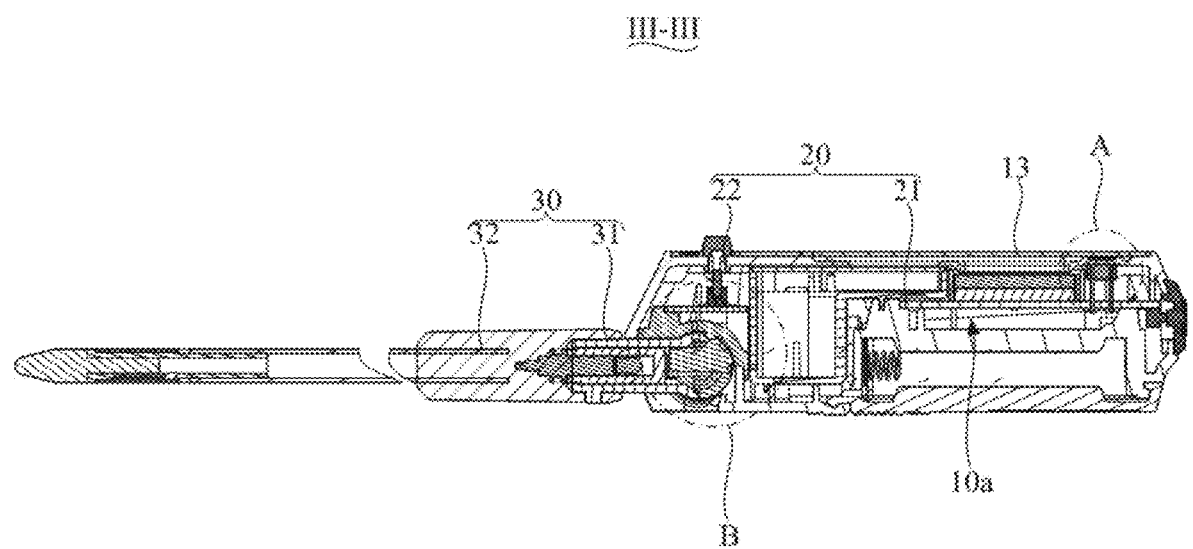
FIG. 3 is a sectional view of the comprehensive environmental monitor shown in FIG. 2 along III-III.
Figure 4:
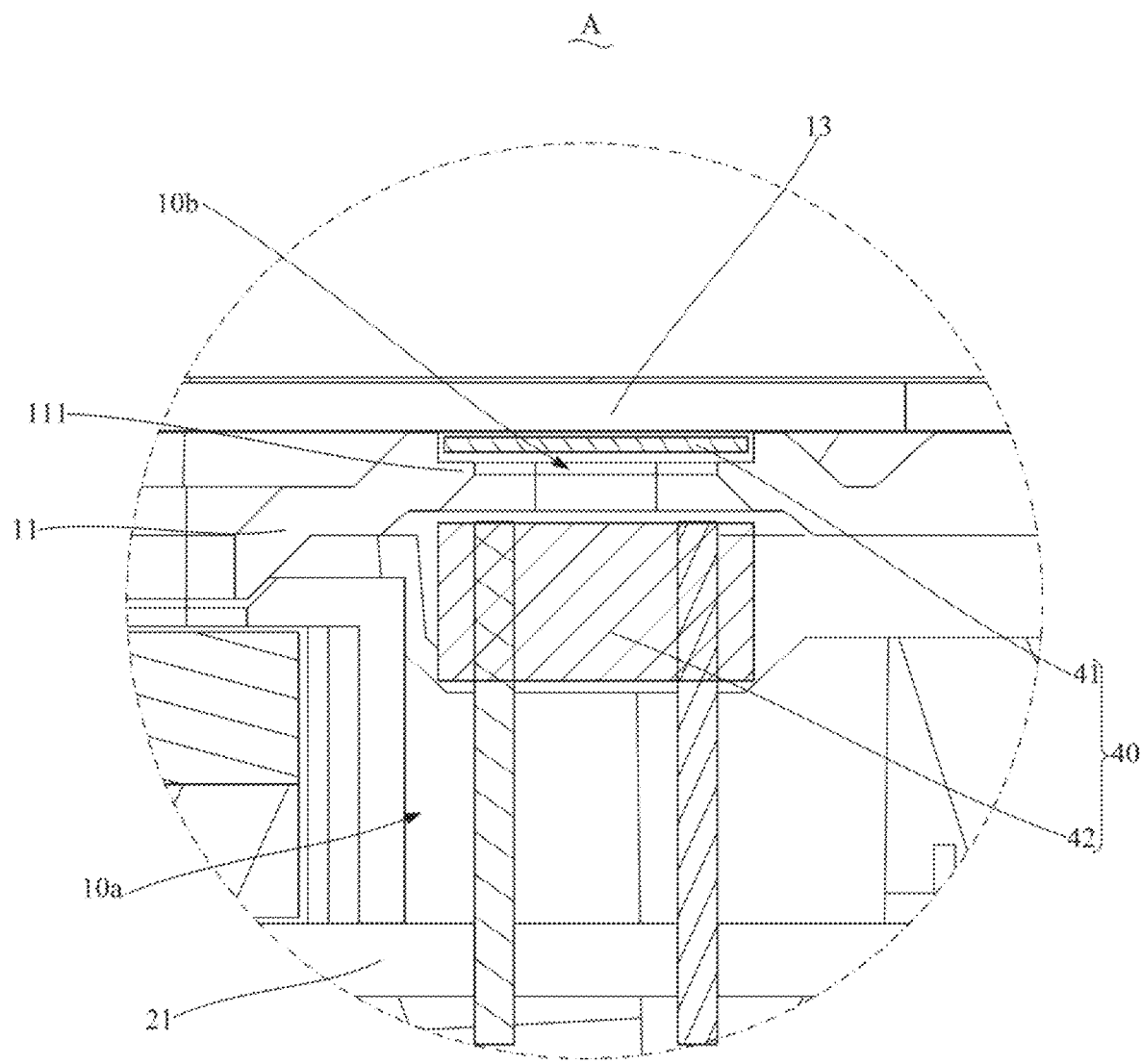
FIG. 4 is a detail enlarged view of A in FIG. 3.

Refer to FIG. 3 and FIG. 4 again. In this embodiment, a positioning flange 111 is protruded from a side wall of the light transmitting hole 10b, and the positioning flange 111 and the upper housing 11 are integrally formed. An area formed by a contour of the positioning flange 111 is less than an area of the light filter 41. The positioning flange 111 is disposed, so that on a cross section, the light transmitting hole 10b is a stepped hole. In addition, in a vertical direction, the positioning flange 111 is disposed around the light sensor 42, in other words, an effective sensing area of the light filter 42 is within the positioning flange 111. During actual assembling, the light filter 41 is placed on the positioning flange 111, and fits a surface of the positioning flange 111, so that the light filter 41 is convenient in mounting.

Further, in this application, the housing 10 further includes a light transmitting cover plate 13. Specifically, the light transmitting cover plate 13 can be formed by a transparent plastic material or is cut from an acrylic plate or a glass plate. A groove that is adaptive to the light transmitting cover plate 13 in shape is formed on a surface of the upper housing 11. The light transmitting cover plate 13 is embedded into the groove, and fits a surface of a side that is of the light filter 41 and that is away from the positioning flange 111. The light filter 41 is pressed into the light transmitting hole 10b through the light transmitting cover plate 13. The plurality of light filters 41 are fastened into the light transmitting holes 10b through the light transmitting cover plate 13. In addition, the light transmitting cover plate 13 is preferably made of a wear-resistant material, and is configured to protect the plurality of light filters 41 during actual use, to avoid reduction of a light filter effect and a deviation of a detection and analysis result due to scratches to surfaces of the light filters 41.

It may be understood that, spectroscopic analysis in this application is implemented through the plurality of light filters 41 and the plurality of light sensors 42. Therefore, the comprehensive environmental monitor is simple in structure, and is convenient in mounting.

Figure 5:
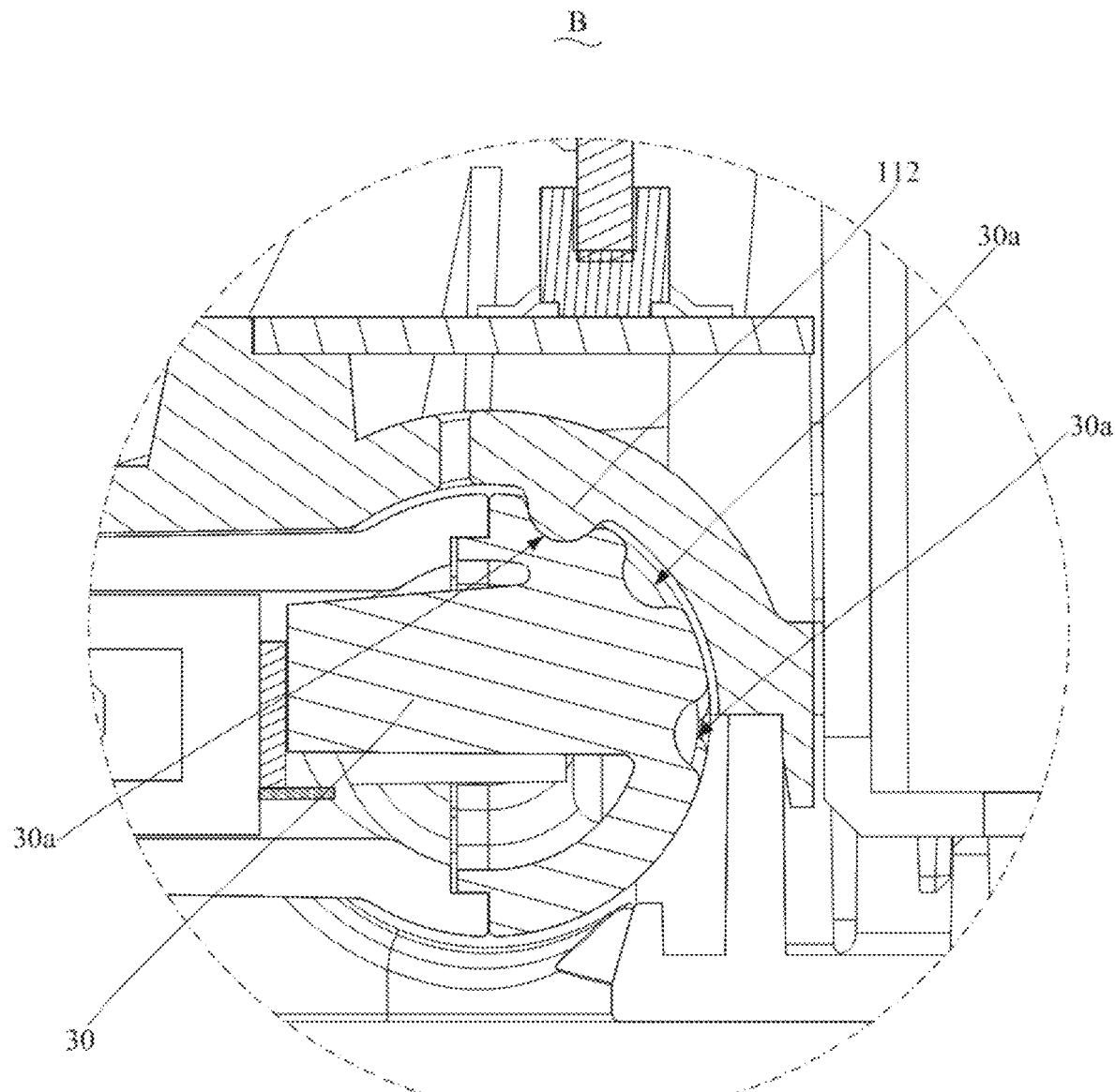
FIG. 5 is a detail enlarged view of B shown in FIG. 3.

Refer to FIG. 3, FIG. 5, and FIG. 7 again. According to this application, the detection probe 30 is disposed, so that the comprehensive environmental monitor 100 can be configured to detect humidity, fertility, a PH value, and the like in a soil environment, facilitating detection of the user in different conditions. According to this application, a mounting groove 10*c* is provided on a side wall of the mounting cavity 10*a*, an avoidance hole 10*d* that communicates with the mounting groove 10*c* is provided in the housing 10, and an end part of the detection probe 30 is rotatably clamped into the mounting groove 10*c*, and partially extends out from the avoidance hole 10*d*.

Specifically, the housing 10 further includes a limiting base. The limiting base is a thin housing that is integrally formed by a plastic material. The limiting base is fastened to the mounting cavity 10*a* through a bolt, and is limited with a side wall of the mounting cavity 10*a* to form the mounting groove 10*c*. The avoidance hole 10*d* that communicates with the mounting groove 10*c* is formed on the housing 10. A cross section of the mounting groove 10*c* is circular. A shape of an end part of the detection shape is adaptive to a shape of the mounting groove 10*c*. The end part of the detection probe is embedded into the mounting groove 10*c*, and partially extends out from the avoidance hole 10*d*. Under external force, the detection probe 30 is capable of rotating by a specific angle relative to the housing 10. In this way, in an actual detection process, the detection probe 30 can be rotated to adapt to different environmental detection needs better.

Further, a plurality of positioning grooves 30*a* are recessed on the end part of the detection probe 30. The plurality of positioning grooves 30*a* are spaced from each other in a circumferential direction of the end part of the detection probe 30. The positioning grooves 30*a* are formed on an axis of symmetry of the detection probe 30. A cross section of the positioning groove 30*a* is semicircular. A positioning protrusion 112 is protruded from a side wall of the mounting groove 10*c*, and a cross section of the positioning protrusion 112 is also semicircular. When the detection probe 30 rotates, the positioning protrusion 112 is correspondingly embedded into any positioning groove 30*a* to fasten the detection probe 30 and the housing 10, so that the detection probe 30 and the housing 10 are prevented from rotating relative to each other in a detection and analysis process, ensuring stability of detection and analysis. In addition, the positioning grooves 30*a* are provided on a center axis of the detection probe 30, so that a space utilization rate of the detection probe 30 is high, and the comprehensive environmental monitor 100 is more compact in structure.

Further, the positioning protrusion 112 includes a protrusion body 1121 and a positioning elastic sheet 1122 connected to the protrusion body 1121. The positioning elastic sheet 1122, the protrusion body 1121, and the limiting base are of an integrally formed structure. Under external force, the positioning elastic sheet 1122 can have specific elastic deformation relative to the limiting base. It may be understood that, when the detection probe 30 rotates, the protrusion body 1121 and a surface of the detection probe 30 may generate specific action force, and the action force can be buffered to a specific extent through the positioning elastic sheet 1122, so that the detection probe 30 and the protrusion body 1121 are prevented from being blocked in a rotation process. In this case, the detection probe 30 is smoother in rotation, and is more convenient in angle adjustment.

Figure 7:
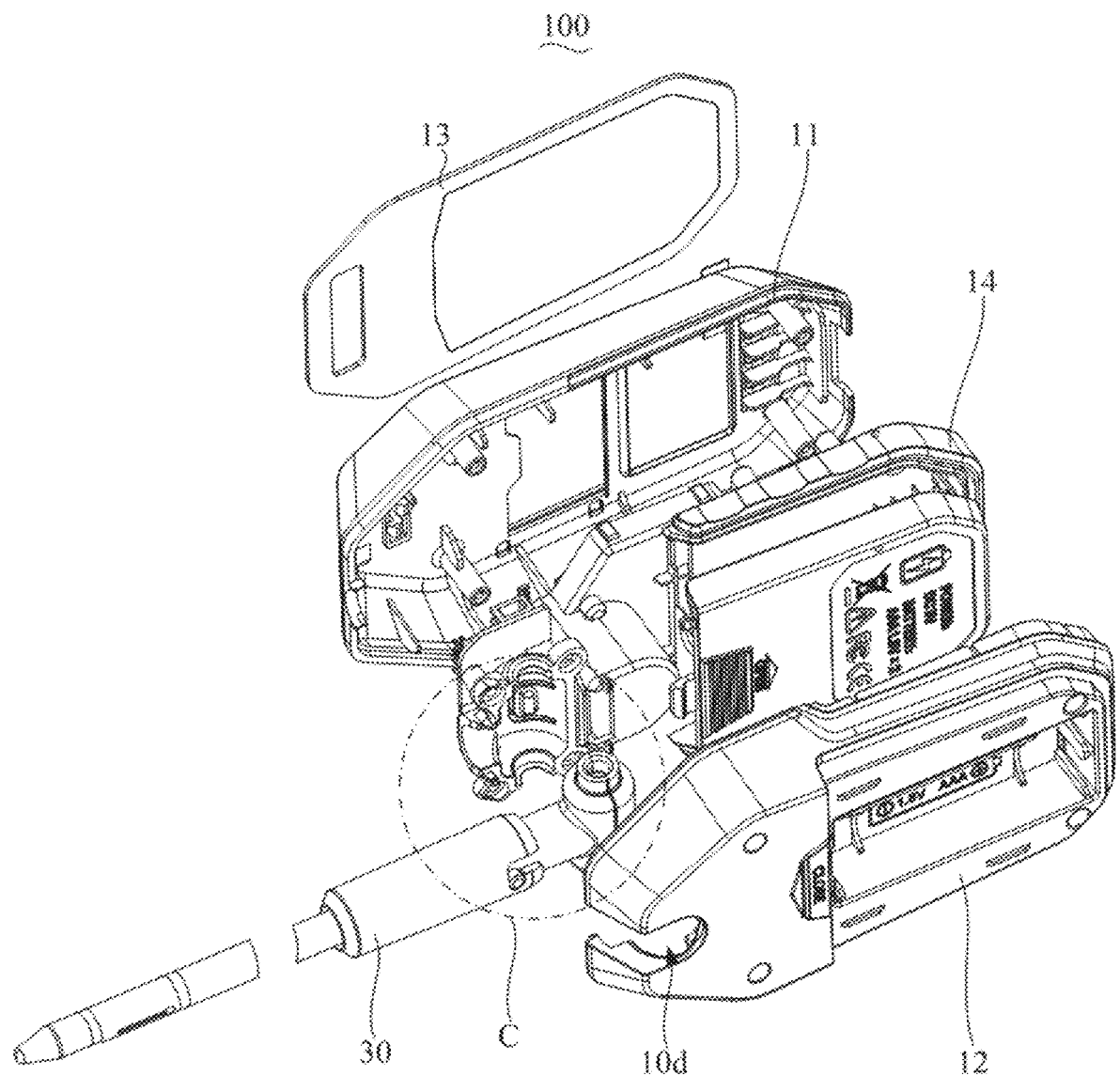
FIG. 7 is an exploded view of a structure of the comprehensive environmental monitor shown in FIG. 1 in another perspective.
Figure 8:
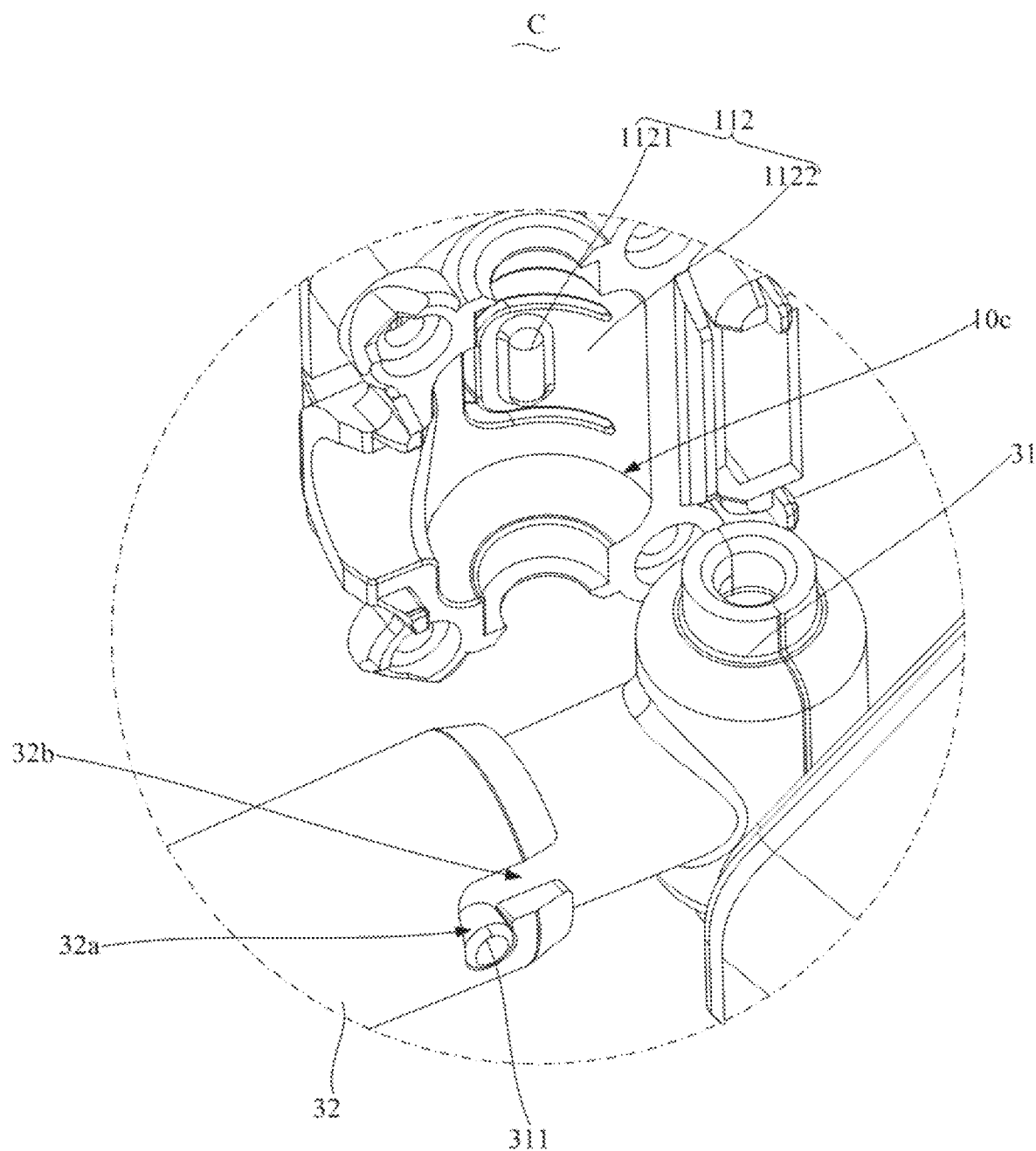
FIG. 8 is a detail enlarged view of C in FIG. 7.

Refer to FIG. 7 and FIG. 8 again. In an embodiment of the present disclosure, the detection probe 30 includes a mounting base 31 and a probe body 32 that are detachably connected. Specifically, the mounting base 31 is integrally T-shaped, and an end part of the mounting base 31 is rotatably connected to the mounting groove 10*c*, and is formed with the positioning groove 30*a*. The mounting base 31 partially extends out from the mounting cavity 10*a* through the avoidance hole 10*d*. An end part that is of the probe body 32 and that faces the mounting base 31 is provided with a clamping groove (not shown in the figure) that is adaptive to the end part of the mounting base 31 in shape, so that the end part of the mounting base 31 can be clamped into the clamping groove. According to this application, the mounting base 31 and the probe body 32 that are detachably connected are disposed, so that a detection and analysis distance of the detection probe 30 can be effectively extended, and the detection probe 30 is convenient to store and carry.

It may be understood that, the probe body 32 and the mounting base 31 are respectively provided with a metal socket and a metal plug. The metal plug is connected to the control circuit board 21 in the mounting cavity 10*a* through a terminal connection line. When the end part of the mounting base 31 is clamped into the positioning groove 30*a*, the metal plug is inserted into the metal socket to electrically connect the probe body 32 and the control circuit board 21, so that an electrical signal detected by the probe body 32 can be transmitted to a side of the control circuit board 21.

Refer to FIG. 8 again. In an embodiment of the present disclosure, the probe body 32 is further provided with an avoidance notch 32*b* and a clamping notch 32*a* that communicate with the clamping groove. Specifically, the avoidance notch 32*b* penetrates an upper surface of the probe body 32 and is disposed at an included angle of 90° with the clamping notch 32*a*. The clamping protrusion 311 is protruded from the mounting base 31, and the clamping protrusion 311 is cylindrical. During actual assembling, the clamping protrusion 311 extends into the clamping notch 32*a* through the avoidance notch 32*b*. After the probe body 32 rotates, the clamping protrusion 311 is embedded into the clamping notch 32*a* to limit and fasten the probe body 32 and the mounting base 31 in a length direction. It can be seen from an assembling process that the avoidance notch 32*a* and the avoidance notch 32*b* are provided at an included angle, so that the probe body 32 and the mounting base 31 are stably fastened, and it is labor-saving and convenient in dismounting the probe body 32 and the mounting base 31.

Figure 6:
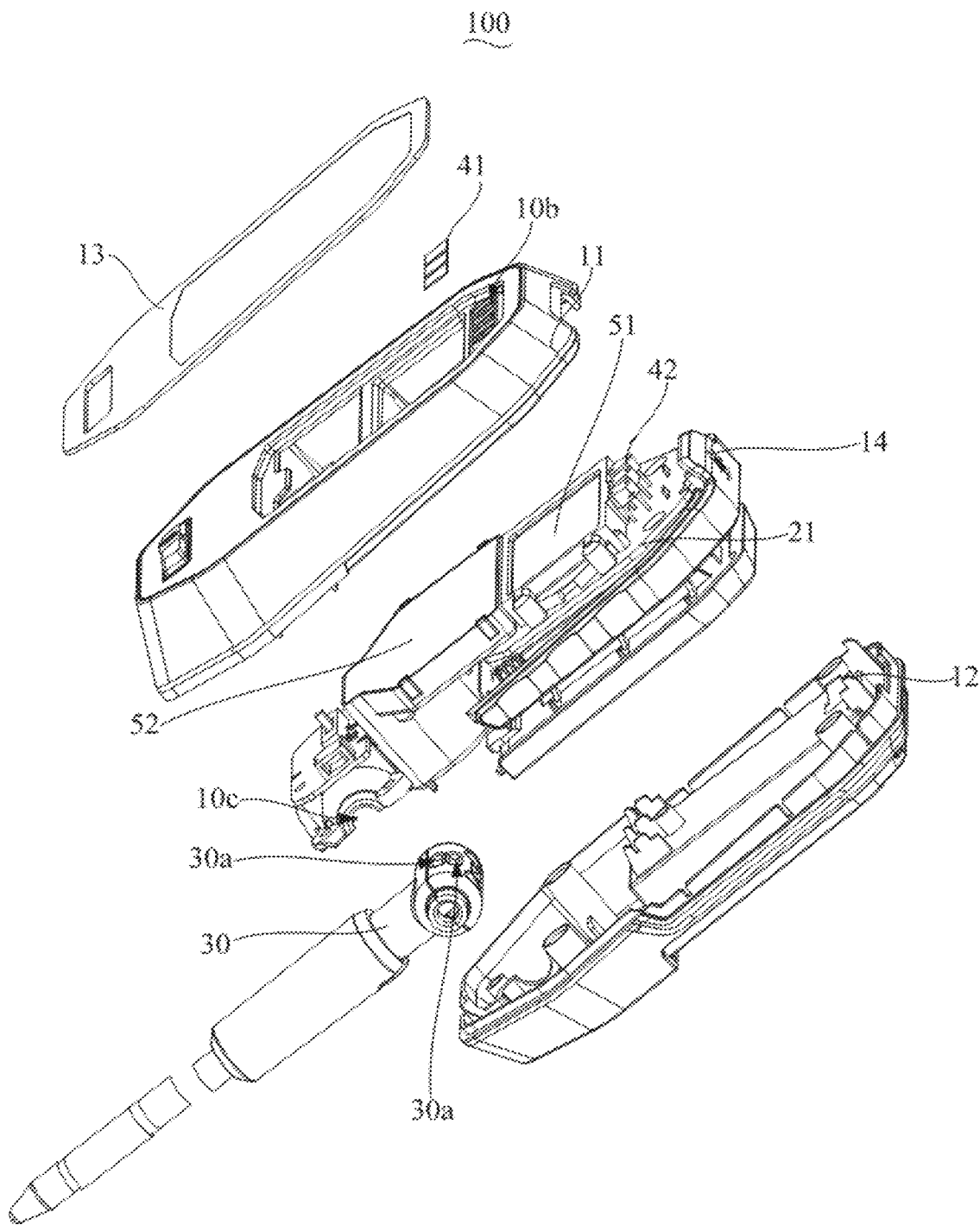
FIG. 6 is an exploded view of a structure of the comprehensive environmental monitor shown in FIG. 1 in a perspective.
Figure 10:
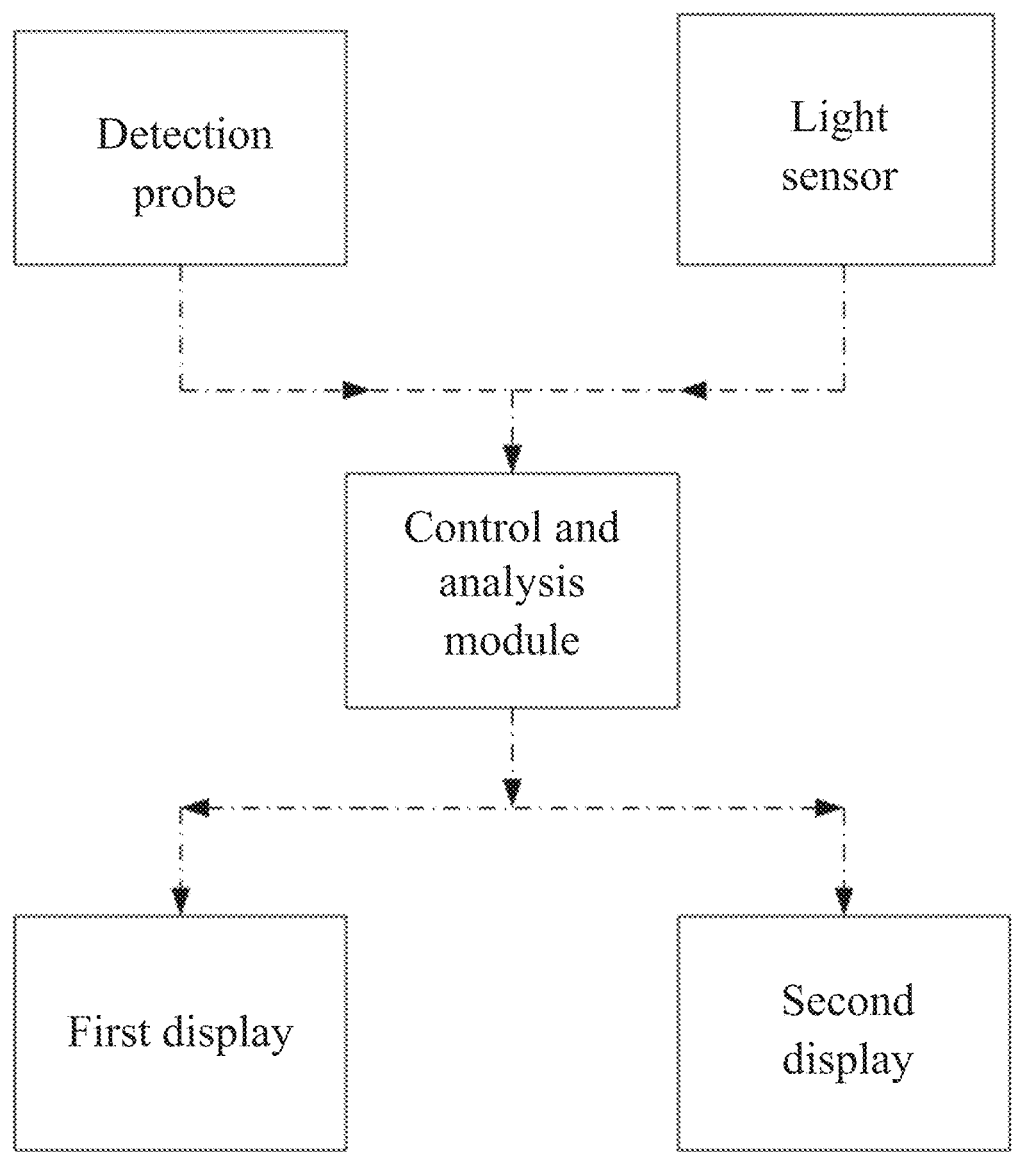
FIG. 10 is a schematic diagram of a working process of a comprehensive environmental monitor according to the present disclosure.
Figure 11:
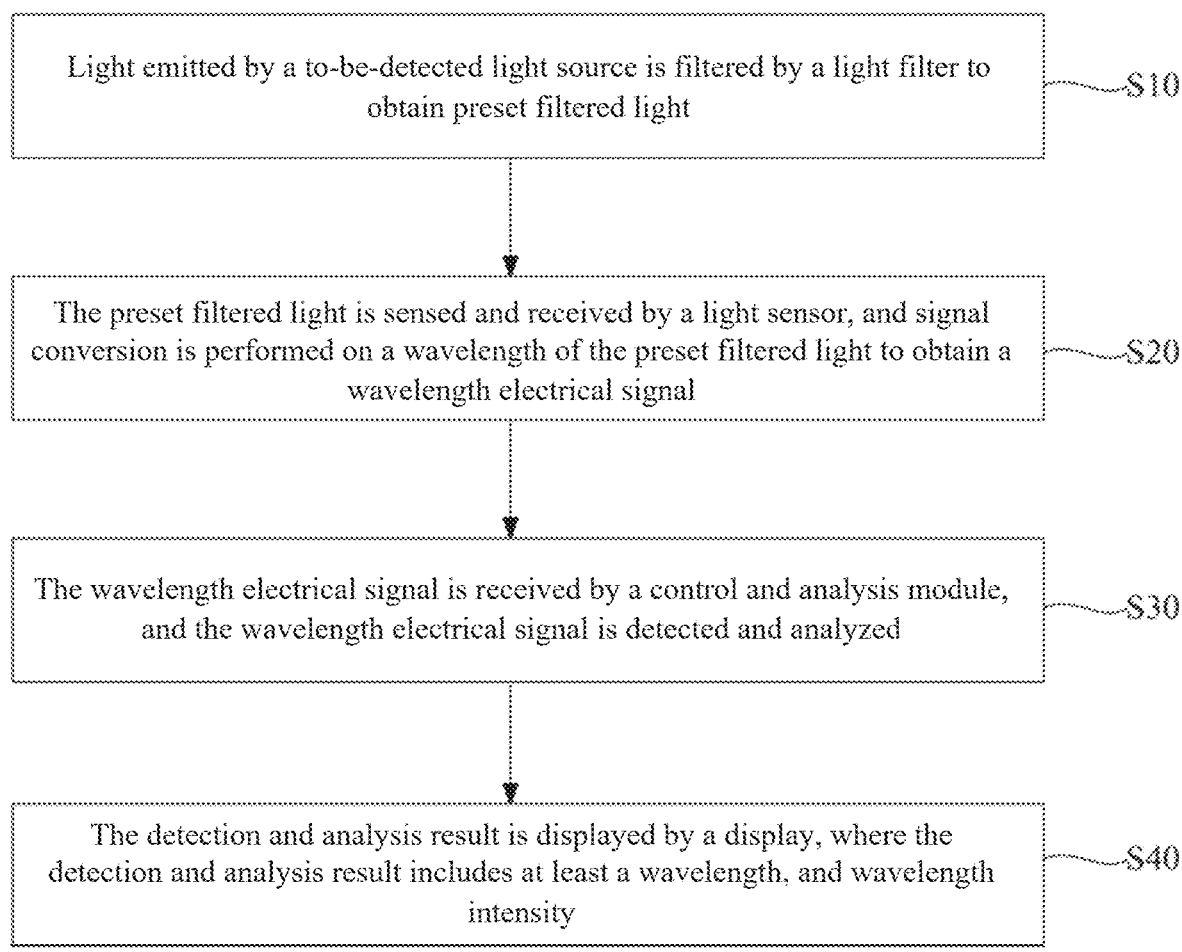
FIG. 11 is a schematic flowchart of a spectroscopic analysis method according to an embodiment of the present disclosure.

Refer to FIG. 6 and FIG. 10 again. According to this application, the comprehensive environmental monitor 100 further includes a first display 51 and a second display 52 that are spaced from each other on the housing. The first display 51 and the second display 52 are separately in communication connection to the control and analysis module 20 through a terminal connection line. The first display 51 can be controlled by the program in the control and analysis module 20 to display a detection and analysis result of the light sensor 42, namely, the light sensor 42 is configured to sense information such as a wavelength of light, a type of light, and a wavelength intensity in an external environment. The second display 52 can be configured to display a detection and analysis result of the detection probe 30, namely information such as humidity, a temperature, a PH value, and a trace element type, detected by the detection probe 30, of external soil. Through split-screen display, it is convenient for a user to observe and record.

Figure 9:
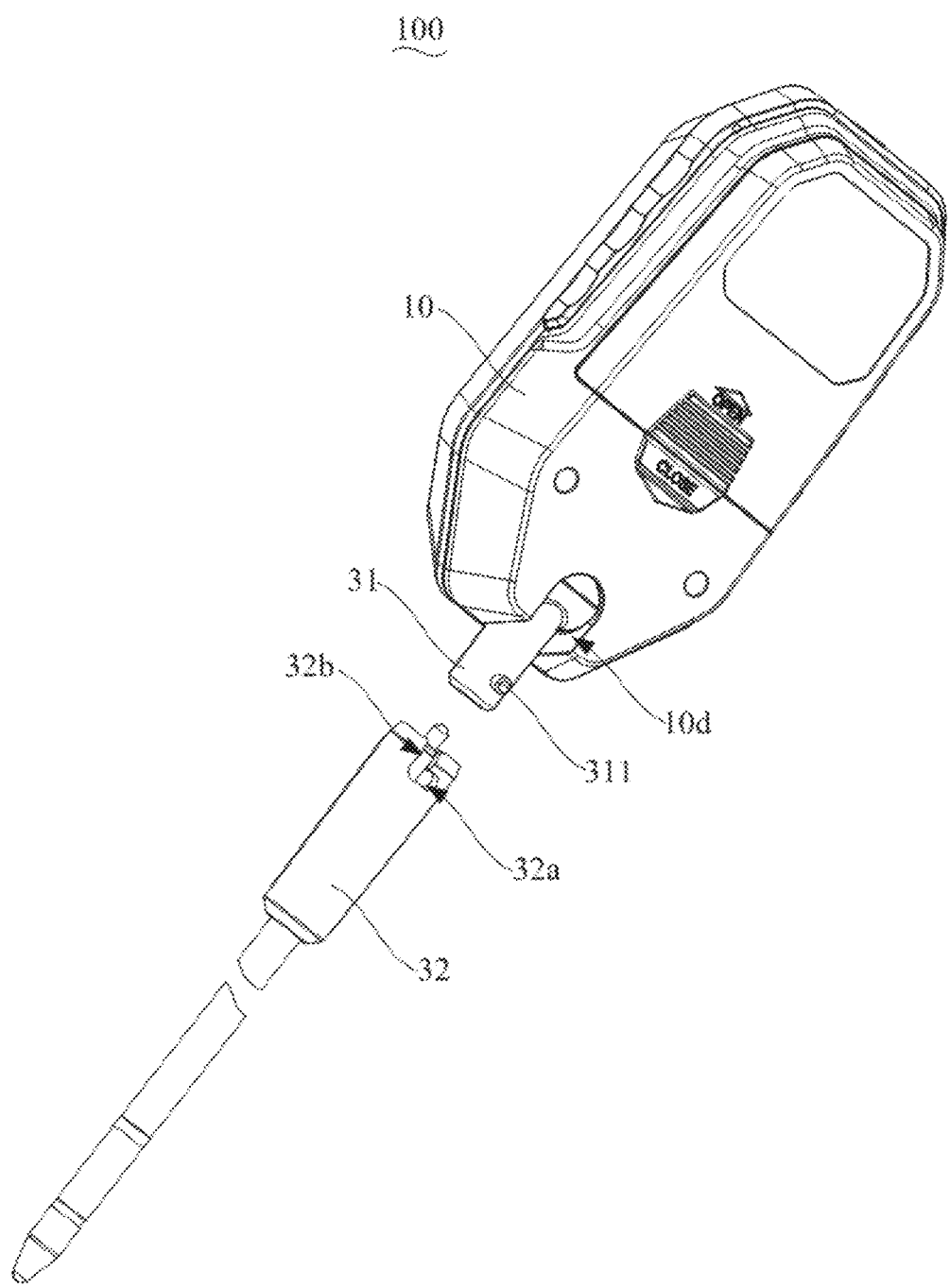
FIG. 9 is an exploded view of a structure of the comprehensive environmental monitor shown in FIG. 1 in still another perspective.

Refer to FIG. 9. Based on a structure of the comprehensive environmental monitor 100, the present disclosure provides a spectroscopic analysis method. The spectroscopic analysis method includes the following steps. In step S10, light emitted by a to-be-detected light source is filtered by the light filter 41 to obtain preset filtered light. In step S20, the preset filtered light is sensed and received by the light sensor 42, and signal conversion is performed on a wavelength of the preset filtered light to obtain a wavelength electrical signal. In step S30, the wavelength electrical signal is received by the control and analysis module 20, and the wavelength electrical signal is detected and analyzed.

Specifically, when the step S10 is performed, the to-be-detected light source may be an object capable of emitting light, such as sunshine or lamplight. The light emitted by the to-be-detected light source is filtered by the light filter 41, to obtain the preset filtered light of a special wavelength. When the step S20 is performed, after the preset filter light obtained through filtering is received and filtered, signal conversion is performed by the light sensor 42 on the wavelength of the preset filtered light, to obtain the wavelength electrical signal. When the step S30 is performed, the converted wavelength electrical signal is received by the control and analysis module 20, and the wavelength electrical signal is detected and analyzed.

According to the spectroscopic analysis method provided in the present disclosure, some of wavelengths in the light are removed through the light filter 41, to obtain the preset filtered light of a preset wavelength; and the preset filtered light is finally detected and analyzed. The method can effectively avoid interference generated by light of another wavelength on the detection and analysis result of the preset filtered light, to precisely and effectively perform component analysis on light of various wavelengths in the to-be-detected light source. The light filter 41 is combined with the light sensor 42. Components adopted by the spectroscopic analysis method are simple in structure, so that spectroscopic analysis costs can be effectively reduced.

According to the present disclosure, after the step that the wavelength electrical signal is received by the control and analysis module 20, and the wavelength electrical signal is detected and analyzed, a step S40 is further included. The step is specifically that the detection and analysis result is displayed by the display 50, where the detection and analysis result includes at least a wavelength, and wavelength intensity. When the step S40 is performed, the display 50 and the control and analysis module 20 are connected through the terminal connection line. Spectroscopic analysis can be performed on the light by using program in the control and analysis module 20. The light is filtered by the light filter 41, therefore, quantitative analysis can be performed on light. Analysis types include a wavelength of light, a wavelength intensity value, a proportion of each wavelength, and the like. An analysis result can be correspondingly displayed on the display 50, so that the user can intuitively observe and record.

The foregoing are merely preferred embodiments of the present disclosure, and the scope of the present disclosure is not limited thereto. Any equivalent structure change made using the content of the specification of the present disclosure and the drawings under the inventive concept of the present disclosure, or direct/indirect application thereof in other related technical fields, shall fall within the protection scope of the present disclosure.

What is claimed is:

1. A comprehensive environmental monitor, comprising:
   a housing, wherein the housing is provided with a mounting cavity, a plurality of light transmitting holes, and a light transmitting cover plate; wherein the plurality of light transmitting holes communicate the mounting cavity with an external environment of the housing, such that light from the external environment passes through the light transmitting holes and enters the mounting cavity;
   a control and analysis module, wherein the control and analysis module is mounted in the mounting cavity;
   a detection probe, wherein the detection probe is connected to the housing, and is in communication connection to the control and analysis module; and
   a light filter component, wherein the light filter component comprises a plurality of light filters and a plurality of light sensors, the plurality of light sensors are mounted in the mounting cavity, and are in communication connection to the control and analysis module, and one of the light filters is mounted in one of the light transmitting holes, and is disposed opposite to one of the light sensors;
   wherein the light filters are configured to select and filter light within a specific wavelength range, such that the filtered light is received by the light sensors to improve detection accuracy of the light sensors for the light within the specific wavelength range, and the light transmitting cover plate is configured to press the plurality of light filters against the light transmitting holes, such that the plurality of light filters are fixed within the plurality of light transmitting holes.

2. A spectroscopic analysis method, applied to the comprehensive environmental monitor according to claim 1, wherein the spectroscopic analysis method comprises the following steps:
   filtering, by a light filter, light emitted by a to-be-detected light source to obtain preset filtered light;
   sensing and receiving, by a light sensor, the preset filtered light, and performing signal conversion on a wavelength of the preset filtered light, to obtain a wavelength electrical signal; and
   receiving, by a control and analysis module, the wavelength electrical signal, and detecting and analyzing the wavelength electrical signal.

3. The spectroscopic analysis method according to claim 2, wherein after the receiving, by a control and analysis module, the wavelength electrical signal, and detecting and analyzing the wavelength electrical signal, the spectroscopic analysis method further comprises:
   displaying, by a display, the detection and analysis result, wherein the detection and analysis result comprises at least a wavelength, and wavelength intensity.

\* \* \* \* \*